US005323467A

United States Patent [19]

Hermes

[11] Patent Number: 5,323,467

[45] Date of Patent: Jun. 21, 1994

[54] METHOD AND APPARATUS FOR SOUND ENHANCEMENT WITH ENVELOPES OF MULTIBAND-PASSED SIGNALS FEEDING COMB FILTERS

[75] Inventor: Dirk J. Hermes, Eindhoven, Netherlands

[73] Assignee: U.S. Philips Corporation, New York, N.Y.

[21] Appl. No.: 6,441

[22] Filed: Jan. 21, 1993

[30] Foreign Application Priority Data

Jan. 21, 1992 [EP] European Pat. Off. ........ 92200155.7

[51] Int. Cl.[5] ........ H04B 15/00

[52] U.S. Cl. ........ 351/94

[58] Field of Search ........ 381/46, 47, 94, 118

[56] References Cited

U.S. PATENT DOCUMENTS

| | | | |
|---|---|---|---|
| 3,094,586 | 6/1963 | Dersch | 381/47 |
| 3,403,224 | 9/1968 | Schroeder | 381/47 |
| 3,418,429 | 12/1968 | Clapper | 381/46 |
| 3,431,355 | 3/1969 | Rothauser et al. | 381/47 |
| 4,135,590 | 1/1979 | Gaulder | 381/94 |
| 4,433,435 | 2/1984 | David | 381/94 |
| 4,701,953 | 10/1987 | White | 381/46 |
| 4,932,063 | 6/1990 | Nakamura | 381/94 |
| 5,097,510 | 3/1992 | Graupe | 381/47 |
| 5,212,764 | 5/1993 | Ariyoshi | 381/94 |

FOREIGN PATENT DOCUMENTS

| | | | |
|---|---|---|---|
| 2-278298 | 11/1990 | Japan | 381/47 |
| 3-256100 | 11/1991 | Japan | 381/47 |

OTHER PUBLICATIONS

"A Theory of Multirate Filter Banks" IEEE Transactions on Acoustics, Speech and Signal Processing, vol. ASSP 35, No. 3, Mar. 1987, pp. 356-372.

"Evaluation of an Adaptive Comb Filtering Method for Enhancing Speech Degraded by White Noise Addition" IEEE Transactions on Acoustics . . . vol. ASSP-26, No. 4, Aug. 1978 pp. 354-358.

*Primary Examiner*—Forester W. Isen

*Attorney, Agent, or Firm*—David L. Schreiber

[57] ABSTRACT

Sound is processed for therein enhancing wanted sound with respect to unwanted sound. The sound is distributed over a plurality of parallel pass bands. In each channel, possibly with excepting the lowest frequency channels, the envelope of the respective signals in that frequency band is detected. Next, the envelope, or in the lowest frequency channels, the signal itself is preferentially filtered for enhancing signals at the fundamental frequency of the wanted sound. Subsequently, as far as applicable, the signal filtered is modulated with the envelope found for the channel in question and all channel outputs are summed.

13 Claims, 3 Drawing Sheets

METHOD AND APPARATUS FOR SOUND ENHANCEMENT WITH ENVELOPES OF MULTIBAND-PASSED SIGNALS FEEDING COMB FILTERS

BACKGROUND OF THE INVENTION

The invention relates to a method for processing source sound for therein enhancing wanted sound with respect to unwanted sound, said method comprising the steps of:

distributing said source sound over a plurality of bandpass filters in as many channel in parallel;

in each channel applying a respective filter means for preferentially filtering the wanted sound with respect to the unwanted sound in that channel's frequency band;

aggregating output signals of said channels to an enhanced output sound.

First, the wanted sound may be speech, or more generally, such sound to which a particular pitch may be attributed. Sound having no such pitch is left out of consideration as a target for being enhanced. Now, sound enhancing is improving the signal-to-noise ratio, wherein the noise may be another sound or voice than the one to be enhanced, music, noises generated by identifiable objects such as machines, or just physically present noise, of which the source is unknown or indistinct. Such enhancing intends to make the wanted sound better comprehensible, more agreeable or otherwise more suitable. It would be feasible to enhance the sound of a particular musical instrument with respect to other instruments. The result of the enhancing may be used per se. Another application would be to subtract the enhanced signal from the source signal for subsequently using or further processing of the subtraction result.

The described straightforward method may succeed for low frequencies that are coupled to the pitch of the signal in question, whether wanted or unwanted. Higher harmonics, however, cause problems of various nature. First, the phase of such higher harmonics is less precisely coupled to the basic pitch period; in extreme cases, the phase itself is subject to noisy phenomena. Therefore, such methods would attribute to these latter noisy phenomena a certain harmonic structure. This would, in its turn, cause disturbances in the higher frequency range of the wanted signal, and effectively attenuate higher-frequency components thereof. This effectively would render the recited solution imperfect with respect to the objects recited supra.

SUMMARY OF THE INVENTION

Accordingly, amongst other things it is an object of the invention to provide a straightforward speech enhancing method that may be easily adapted to actual needs and allows for a broad field of applications. Now, according to one of its aspects, the method of the invention is characterized in that feeding each bandpass filter's output to an envelope detecting means to feed that channel's filter means;

feeding each respective filter means' output to an envelope modulating means to generate that channel's output signal.

The philosophy of thē present invention is that at higher frequencies the phase of the envelope rather than the phase of the signal itself is coupled to the pitch period. Unwanted signals should therefore be filtered out by adaptively filtering the envelopes of the respective frequency bands rather than the signal itself.

Advantageously, said filter means comprise comb filter means. Now, single channel comb filtering on the signal itself has been described in J. S. Lim et al., Evaluation of an adaptive comb filtering method for enhancing speech degraded by white noise addition, IEEE Transactions on Acoustics, Speech and Signal Processing, Volume ASSP 26 (1978), pages 354–358. The present solution is to apply filtering, in particular, but not limited to comb filtering, in a plurality of parallel channels, as executed on the signal envelopes. A slightly different solution is to replace the comb filtering by harmonical selection. If the wanted signal is stationary, the two methods are mathematically equivalent, and the term used in the Claim would also cover the later technology. In particular, the latter technology relates to a change from the time domain to the spectral frequency domain. If the wanted signal, however, is non-stationary, the translation to harmonical selection is no longer correct. For the correctness of the comb-filtering approach proper however, the wanted signal needs not be stationary. Now, the above methods apply because it has been found that encoding a signal and reconstruction thereof by means of the envelopes of the various frequency bands will produce a wanted signal practically without audible distortion. By itself, multirate filtering for subband coding/decoding has been described in Martin Vetterli, A Theory of Multirate Filter Banks, IEEE Transactions on Acoustics, Speech and Signal Processing, Volume ASSP 35, No. 3, March 1987, pages 356–372.

The invention also relates to an apparatus for speech enhancement comprising a first plurality of channels assigned to respective contiguous frequency bands, said apparatus comprising distributing means for distributing said source sound over said channels, each channel comprising:

bandpass filter means at a frequency of the associated channel;

envelope detecting means fed by the channel's bandpass filter means;

comb filter means fed by the channel's envelope detecting means fed by the channel's;

envelope modulating means fed by the channel's filter means;

said apparatus furthermore having output means fed by outputs of all channels in parallel. Such apparatus would find useful application for speech and music processing, for example for reproduction purposes, both real-time and in recording, for information dissemination, education, entertainment, psychology, musically, linguistics, historical studies and forensic investigation.

Various advantageous aspects are recited in dependent Claims. In all of the instances, the enhancement always is a relative one, that may be combined with amplification or attenuation of the wanted signal itself.

BRIEF DESCRIPTION OF THE DRAWINGS

For a fuller understanding of the invention, reference is had to the following description taken in connection with the accompanying drawings, in which.

DETAILED DESCRIPTION OF A PREFERRED EMBODIMENT

Figure 1A:
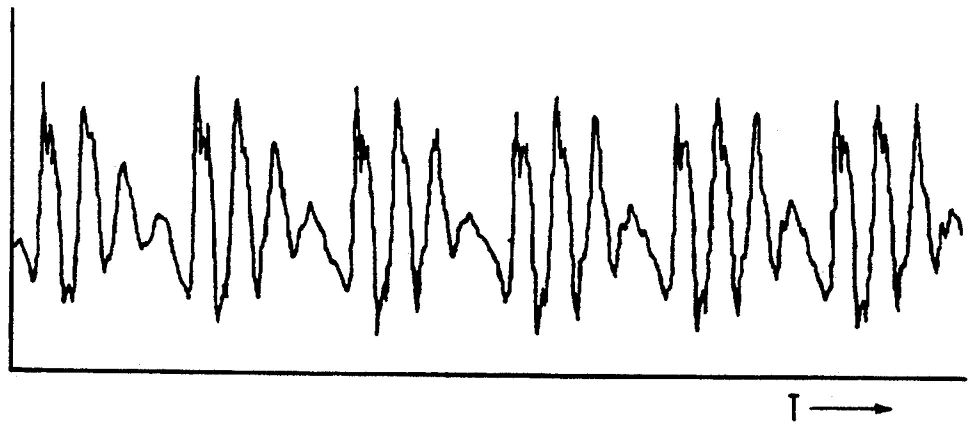
FIGS. 1*a*–1*c* represent various signal diagrams that are relevant in the embodiment.

FIG. 1*a* is an amplitude versus time signal of a speech sample that is exclusively shown by way of example. Time as well as amplitude should only be considered as relative quantities, inasmuch as the invention is directed to various kinds of signal sources although speech is an important field of use. However, all kinds of other sounds would apply that have physical sources of more complicated nature than those that produce pure harmonics.

Figure 1B:
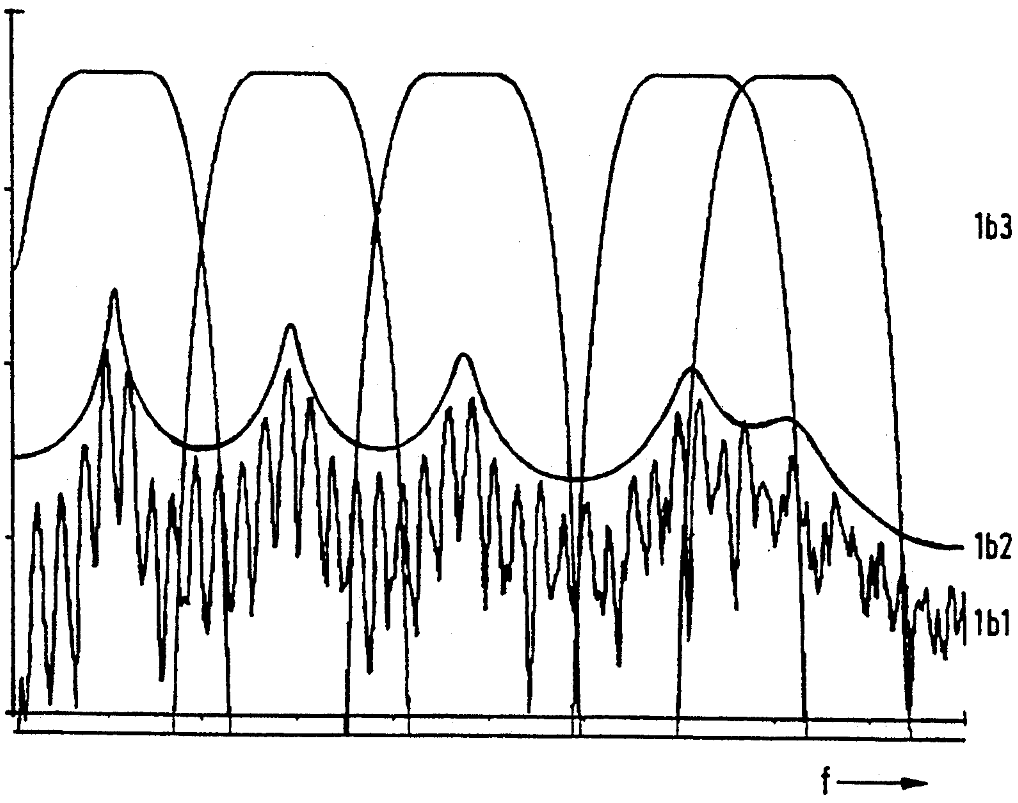

FIG. 1*b* shows the same signal as FIG. 1*a*, but now transposed to the frequency domain. The frequency range is 0-5000 Hertz on a linear scale. Amplitude is relative; in this respect the Figure is illustrate, not calibrative. Curve 1b1 is the logarithm of the spectral amplitude as a function of frequency f. At lowest frequencies the amplitude is extremely low. At intermediate frequencies, the amplitude is sometimes high and sometimes low. Much variation exists, however. At high frequencies, the amplitude gradually sinks, but not without further variation. Curve 1b2 is the spectral envelope of the signal that had caused curve 1b1, again as a function of frequency. For better clarity, curve 1b2 has been given some upward shift with respect to curve 1b1. Notably, the variations in curve 1b2 are much smoother than those in curve 1b1. The peaks in the envelope generally correspond to the so-called formant frequencies of speech. For discussion on the formant phenomena, reference is had to standard textbooks on speech analysis. Curves 1b3 represent bandpass filters for each of the five respective formant frequencies. Bandwidth is approximately 500 Hertz. The flat parts of the transmission curves represent essentially 100% transmission. In an actual optimum embodiment of the present invention, there would be more of these bandpass filters, so that the full acoustic energy would be transmitted. The passbands also would be narrower and, closer to each other (about just as far as the two passbands associated to the two highest formant frequencies). In practice, widths of ⅓ of an octave would be most logical for perceptive reasons. Anyway, the aggregated transmission curve of all passband filters combined should not have holes, but should be essentially flat with respect to frequency.

Figure 1C:
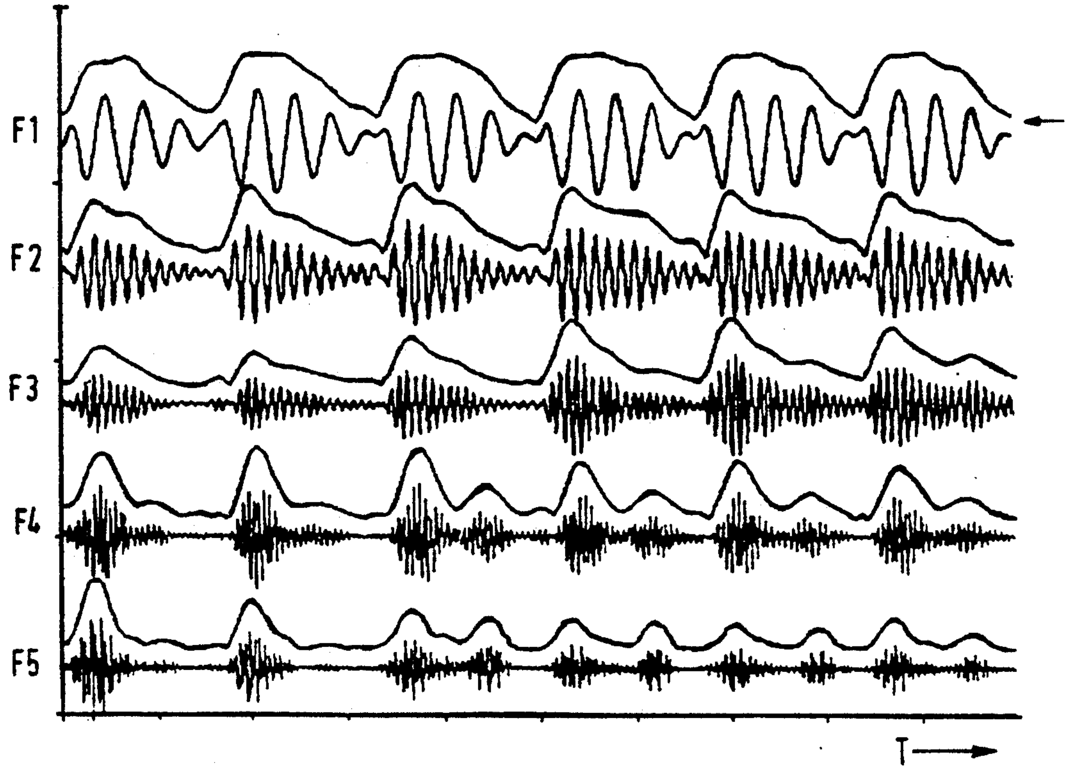

FIG. 1*c* shows five curve pairs, each pair associated to a particular one of the five formant frequencies of curve 1b2. Of each pair, the lower curve represents the transmitted amplitude of the signal itself. The upper curve (shifted vertically somewhat) represents the amplitude envelope of the transmitted signal. The upper pair is associated to the basic pitch of the speech sound in question as passed by an appropriate bandpass filter. Common pitch frequencies for adult male voice are 50-200 Hertz, although lower values are not uncommon. Female and juvenile voices have substantially higher pitches, 150-300 Hertz for females, up to 400 for children while soprano pitch may incidentally rise to 1200 Hertz. Now, as shown, the signal itself is modulated with an almost periodical amplitude. The envelope is periodic with the pitch frequency. Such pitch variation as exists is slow relative to the pitch period. The next pair of curves symbolizes the speech signal of the next higher formant frequency with respect to the pitch (roughly the 2½th harmonic in this example). On the one hand, the phase with respect to the pitch shows some fluctuation with time, and also, the signal shape is less sinusoidal than of the first formant. This phenomenon grows still more clear for the curve pairs associated to the highest frequency formants. F3, F4, F5: although the gross shape (=related to the envelope) is rather periodic, this does not apply to the signal itself, which is very non-periodic. At the highest frequency formants even the envelope gets seriously non-periodic. This means that large phase variations occur. In consequence, the present invention uses the envelope of the high frequency bands for further processing. Generally, non-speech signals would lead to similar signal diagrams.

Figure 2A:
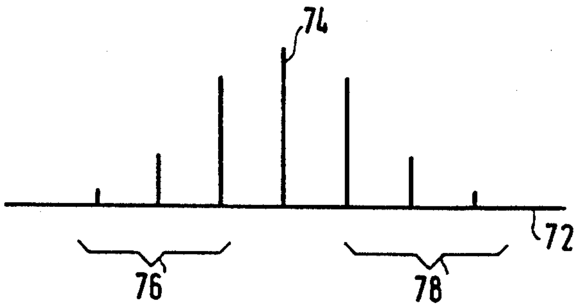
FIGS. 2*a*–2*d* represent various response diagrams that are relevant to the embodiment.

FIG. 2*a* exemplifies the impulse response of a comb filter. The heights of the respective peaks add to 1. The output of the filter is the convolution of the input signal with the transmission coefficients of the respective comb teeth. The interval between contiguous teeth is the known or measured pitch period of the input signal. Therefore, at constant pitch, the comb is generally symmetric, although this requirement is not completely strict. Generally, response coefficients get lower at a further distance from the centre. The number of coefficients has been chosen as an odd value of 7, but other values, inclusive even values, are applicable as well. Generally, the layout of FIG. 2*a* is rather arbitrary. The repetition of the comb filter's application is arbitrary, but usually faster than the pitch frequency itself.

Figure 2B:
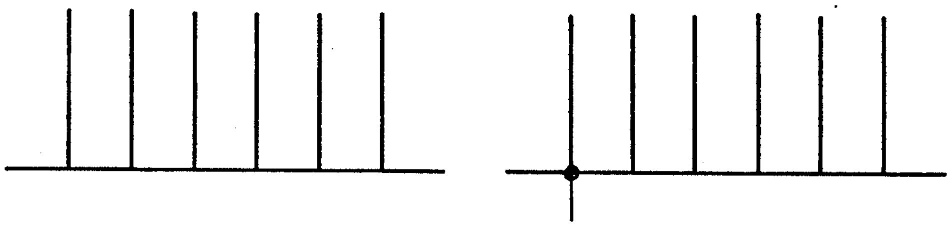

FIG. 2*b*, at left, shows an infinite pulse train in time (=horizontal axis). At right, FIG. 2*b* shows the Fourier-transform thereof: this is an infinite number of identical pulses drawn only at the right hand side of the frequency axis.

Figure 2C:
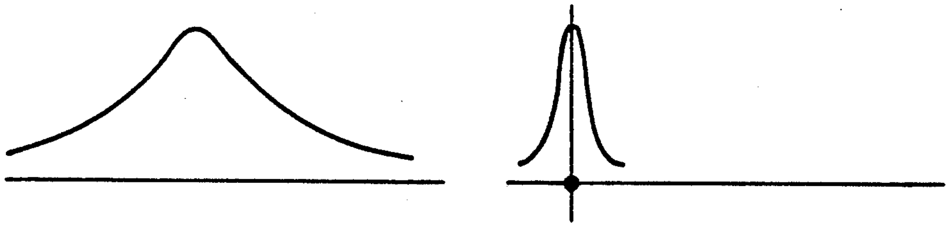

FIG. 2*c*, at left, shows an exemplary window function in time. At right, FIG. 2*c* shows the Fourier-transform at about the same scale as the Fourier-transform in FIG. 2*b*. The result here is a relatively narrow peak that is symmetrically around the zero point of the frequency axis.

Figure 2D:
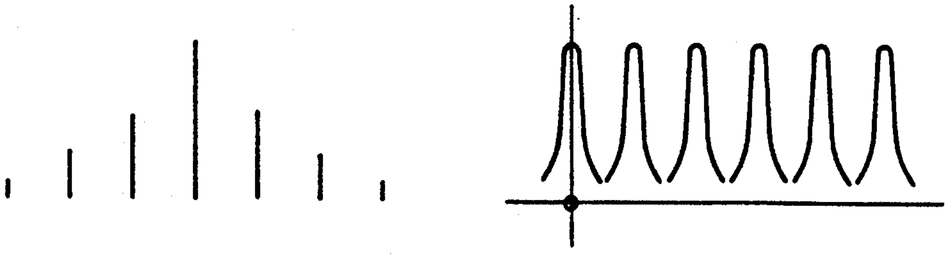

FIG. 2*d*, at left, shows the signal that is transmitted when the window function of FIG. 2*c* operates on the pulse train of FIG. 2*b*. Likewise, at right, FIG. 2*d* shows the result of convolving the Fourier-transforms of the pulse train in FIG. 2*b* and of the window in FIG. 2*c*. The right hand side of FIG. 2*d* now is the Fourier-transform of the left hand side of FIG. 2*d*.

Figure 3:
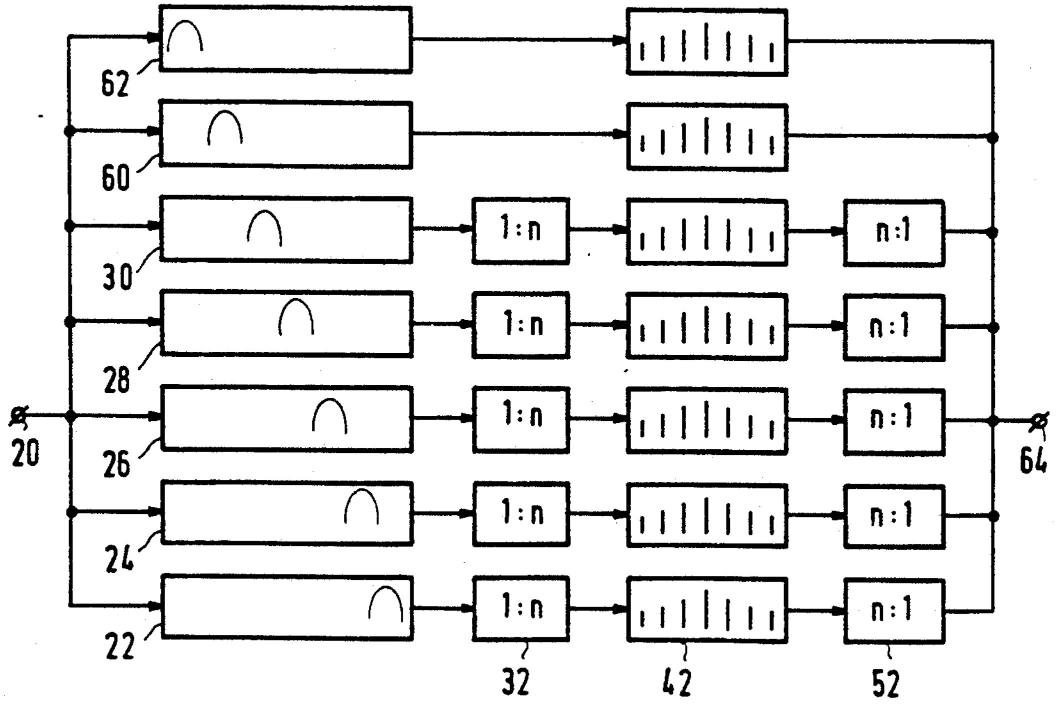
FIG. 3 is a block diagram of an apparatus according to the invention.

Now, FIG. 3 is a block diagram of an apparatus according to the invention. Therein, input means 20 receive the source sound containing the wanted sound to be enhanced on which unwanted sound is superposed. The input may represent microphones or similar transducers, a digital or analog audio transmission channel, or other conventional apparatus. Items 22-30 are a plurality of bandpass filters that have contiguous passbands so that collectively they pass all acoustic energy within the frequency range of interest. Such range need not comprise necessarily all energy on input means 20 and the aggregate transmission coefficient flatness may be chosen according to intended accuracy or other useful criterion. The number of filters is arbitrary, but may be, for example, 32 or 64. In that case, the half-height width of the response curves may be, for example 1/10-⅓ of an octave. The filters may operate according to digital or analog methods.

Array 32 comprises envelope detecting means, for example realized as down-sampling means. In practice, this operates as a demodulator. Down-sampling has been given in the Vetterli reference, op cit. Another easy procedure is double sided rectifying followed by a smoothing procedure. The time constant of the smoothing is comparable to the bandwidth of the band in question. Next, the smoothed signal is sampled at a somewhat lower recurrency. In addition to the five channels so discussed, there are two exemplary additional channels shown that have bandpass filters 60, 62, but no envelope detectors in array 32. The latter channels are applied for the spectrum part where the phase of the signal is invariant. In practice, this is the low-frequency part, for example, for speech, everything below 1250 Hertz, depending on the kind of sound that is being processed. In particular, the width of all bandpass filters is equal as measured in octaves.

Array 42 are the respective comb filters that have been discussed with respect to FIG. 2. Note that all channels have comb filtering, also those not provided with envelope detection means. Moreover, all comb filters preferably have uniform structure in that the inter-teeth distance equals actual pitch period and teeth heights have the same pattern. Array 52 in counterparting to array 32 has modulation of the filtered signal by the respective envelopes detected earlier in array 32. The relative interconnection feeding the modulation-controlling signal from array 32 to array 52 has been suppressed for brevity. Of course, channels that had no envelope detection now also go without modulation-by-envelope. The outputs of all respective channels are combined onto output 64.

Now, the above discloses FIG. 3 on a functional level. Actual realization on the level of electronic circuitry has not been shown, such as synchronization, signal definition, electronic realization, etcetera. Such detailing is left to the skilled art technician.

I claim:

1. A method for processing source sound for therein enhancing wanted sound with respect to unwanted sound, said method comprising the steps of:

distributing said source sound over a plurality of bandpass filters in as many channels in parallel;

in each channel applying a respective filter means for preferentially filtering the wanted sound with respect to the unwanted sound in that channel's frequency band;

aggregating output signals of said channels to an enhanced output sound, characterized by:

feeding each bandpass filter's output to an envelope detecting means to feed that channel's filter means;

feeding each respective filter means' output to an envelope modulating means to generate that channel's output signal.

2. A method as claimed in claim 1, wherein said filter means comprise comb filter means.

3. A method as claimed in claim 1 wherein said wanted sound is human speech sound.

4. A method as claimed in claim 1, for enhancing a particular musical instrument for isolating or subtracting thereof with respect to any further musical instrument.

5. A source sound processing apparatus for use in enhancing wanted sound with respect to unwanted sound according to a method as claimed in claim 1, said apparatus comprising a first plurality of channels assigned to respective contiguous frequency bands, said apparatus comprising distributing means for distributing said source sound over said channels, each channel comprising:

bandpass filter means at a frequency of the associated channel;

envelope detecting means fed by the channel's bandpass filter means;

comb filter means fed by the channel's envelope detecting means;

envelope modulating means fed by the channel's filter means; said apparatus furthermore having output means fed by outputs of all channels in parallel.

6. An apparatus as claimed in claim 5, and having supplementary channel means at a frequency that is lower than and contiguous to the frequency band of said first plurality of channels combined, any supplementary channel in said supplementary channel means being fed by said distributing means and comprising bandpass filter means at a frequency of the associated supplementary channel and comb filter means fed by the channel's bandpass filter means, and also feeding said output means.

7. An apparatus as claimed in claim 6, wherein said envelope detecting means comprise down-sampling means and said envelope modulating means comprise up-sampling means.

8. An apparatus as claimed in claim 5, wherein said comb filter means have mutually uniform filter characteristics, at an inter-teeth spacing that substantially equals an instantaneous fundamental frequency of said wanted sound.

9. A method as claimed in claim 2 wherein said wanted sound is human speech sound.

10. A method as claimed in claim 2, for enhancing a particular musical instrument for isolating or subtracting thereof with respect to any further musical instrument.

11. A method as claimed in claim 3, for enhancing a particular musical instrument for isolating or subtracting thereof with respect to any further musical instrument.

12. An apparatus as claimed in claim 6, wherein said comb filter means have mutually uniform filter characteristics, at an inter-teeth spacing that substantially equals an instantaneous fundamental frequency of said wanted sound.

13. An apparatus as claimed in claim 7, wherein said comb filter means have mutually uniform filter characteristics, at an inter-teeth spacing that substantially equals an instantaneous fundamental frequency of said wanted sound.

* * * * *